United States Patent
McKay, Sr.

[11] 3,795,449
[45] Mar. 5, 1974

[54] CUTTER MONITOR

[75] Inventor: Russell M. McKay, Sr., Los Altos, Calif.

[73] Assignee: Lockheed Missiles & Space Company, Inc., Sunnyvale, Calif.

[22] Filed: Jan. 11, 1973

[21] Appl. No.: 322,708

[52] U.S. Cl.......... 356/160, 90/62 A, 250/219 WD, 250/219 TH, 250/222, 356/151, 356/172
[51] Int. Cl....................... B23c 9/00, G01b 11/26
[58] Field of Search..... 356/160, 172, 156, 28, 256, 356/159; 250/219 WD, 219 TH, 222; 242/75.52, 187; 90/62 A, DIG. 12

[56] References Cited
UNITED STATES PATENTS
2,548,755  4/1951  Vossberg et al. .................... 356/160
3,448,278  6/1969  O'Brien et al. ..................... 356/160

OTHER PUBLICATIONS
J L Craft Device for Rapid Checking etc., IBM Technical Disclosure Bulletin, Feb. 1965.

*Primary Examiner*—Ronald L. Wibert
*Assistant Examiner*—S. K. Morrison
*Attorney, Agent, or Firm*—Billy G. Corber; H. Donald Volk

[57] ABSTRACT

A cutter monitor is used to sense the position of a cutter. Optical non-contact means sense the position of the cutter and produce an electrical output that represents that position. The electrical outout is fed through electronic circuits that convert it to two signals. The first signal drives a directly readable digital output and the second signal is fed to a data processor.

3 Claims, 7 Drawing Figures

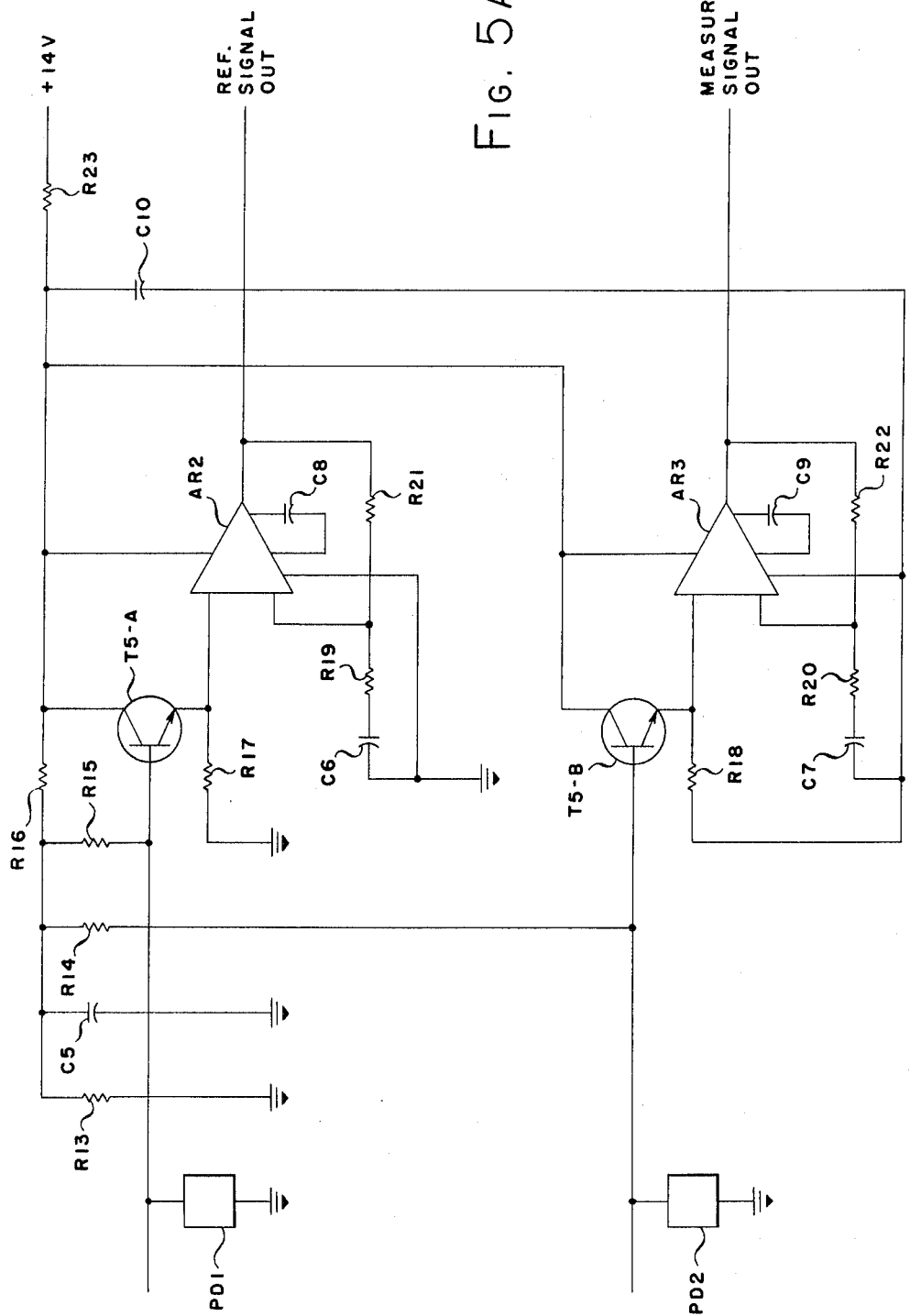

3,795,449

CUTTER MONITOR

BACKGROUND OF THE INVENTION

The present invention relates to a cutter monitor system and more particularly a cutter monitor which senses the $x$, $y$ and $z$ position of a cutter relative to the theoretical program path.

There has been a long and continuous need for better methods and machines to produce a multiplicity of uniform parts with a minimum of loss due to scrap. The problem of manufacturing complex machined parts has been greatly simplified in recent years with the advent of the numerically controlled machine which can be controlled either by a pre-programed tape or directly by a computer. However, even with numerically controlled machines which reduce human error, all parts may still not be uniform. Nonconformity in the work piece can be caused by human and/or equipment error such as cutter size, cutter runout, machine tool misalignment, human intervention in the control of the machine tool, cutter wear and cutter preset inaccuracy.

One technique to assure that only parts meeting a predetermined specification are used is to utilize an inspection probe to test the machined part on the machine after it is machined. Such a probe is shown and described in co-pending patent application Ser. No. 186,231 by the same inventor and assigned to the same Assignee as the present application.

However such a probe measures the finished work piece after it has been machined and can only tell if the part meets a predetermined specification after the fact. It is desirable to assure that a minimum number of scrap pieces are machined. One way to minimize scrap is to constantly monitor the machine tool by checking the cutter for wear, misalignment and positioning inaccuracy prior to the actually machining of the part. To do this, a device for measuring the position of the cutter relative to the programmed path is needed. The invention is directed to such a device.

SUMMARY OF THE INVENTION

This invention is directed to a cutter monitor which senses the position of the cutter by checking its high tooth prior to the machining position. In particular, the cutter monitor disclosed and claimed senses the $x$ and $y$ position of the cutter without touching the cutter. The Z axis may be measured by a contact type measuring device. They measure the location of the "high tooth" relative to the desired position and feed this information to a control system so that corrective action can be taken, either manually or automatically.

BRIEF DESCRIPTION OF THE INVENTION

The features of the present invention which are believed to be novel are set forth with particularity in the appended claims. The present invention, both as to its organization and management of operation, together with further objects and advantages thereof, may best be understood by reference to the following description taken in connection with the accompanying drawings in which:

FIG. 5A is a schematic diagram of an exemplary preamplifier utilized in the present invention;

DESCRIPTION OF THE PREFERRED EMBODIMENT

Figure 1:
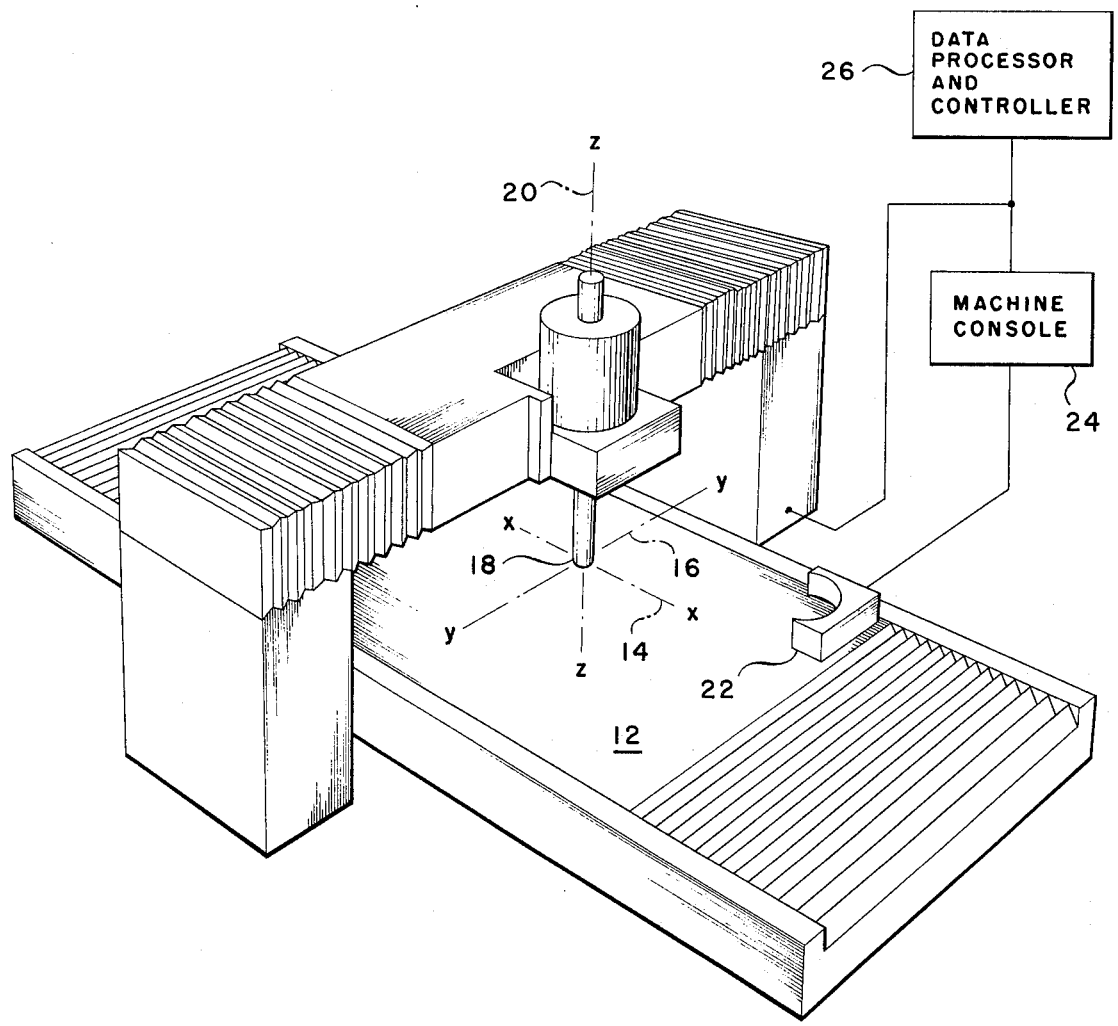
FIG. 1 is a perspective view, showing schematically, the general arrangement of the cutter monitor of the invention.

Referring to FIG. 1, the cutter monitor assembly 22 is shown mounted on the table 12 of a typical type of numerically controlled milling machine. This machine is provided with a table 12 which is rectilinearly movable along the orthogonal $x$ coordinate axis 14. The machine is further provided with a movable cutter 18 which is adapted to be rectilinearly moved along $y$ axis 16 or $z$ axis 20. Machining of the part to be fabricated (not shown) is accomplished with rotating cutter 18 as will be readily understood by those skilled in the art. Each cutter 18, prior to machining the part, is positioned at the measuring point of the $x$, $y$ and $z$ axis measuring assembly 22 of the present invention and, in the manner to be described hereinafter, the position of the cutter is monitored relative to the theoretical program path. Position sensed by the $x$ and $y$ measuring module, in a manner described hereinafter, are transmitted in the form of electrical signal through console 24 and data processor controller 26.

As can be seen from the foregoing description, the position of the cutter can be measured and a determination made if it is within acceptable tolerance limits prior to performing any machine operations on the part. If it is within tolerance, the data processor will allow the machining operation to continue. If it is out of tolerance, the data processor can inhibit machining until corrective action is taken.

Figure 2:
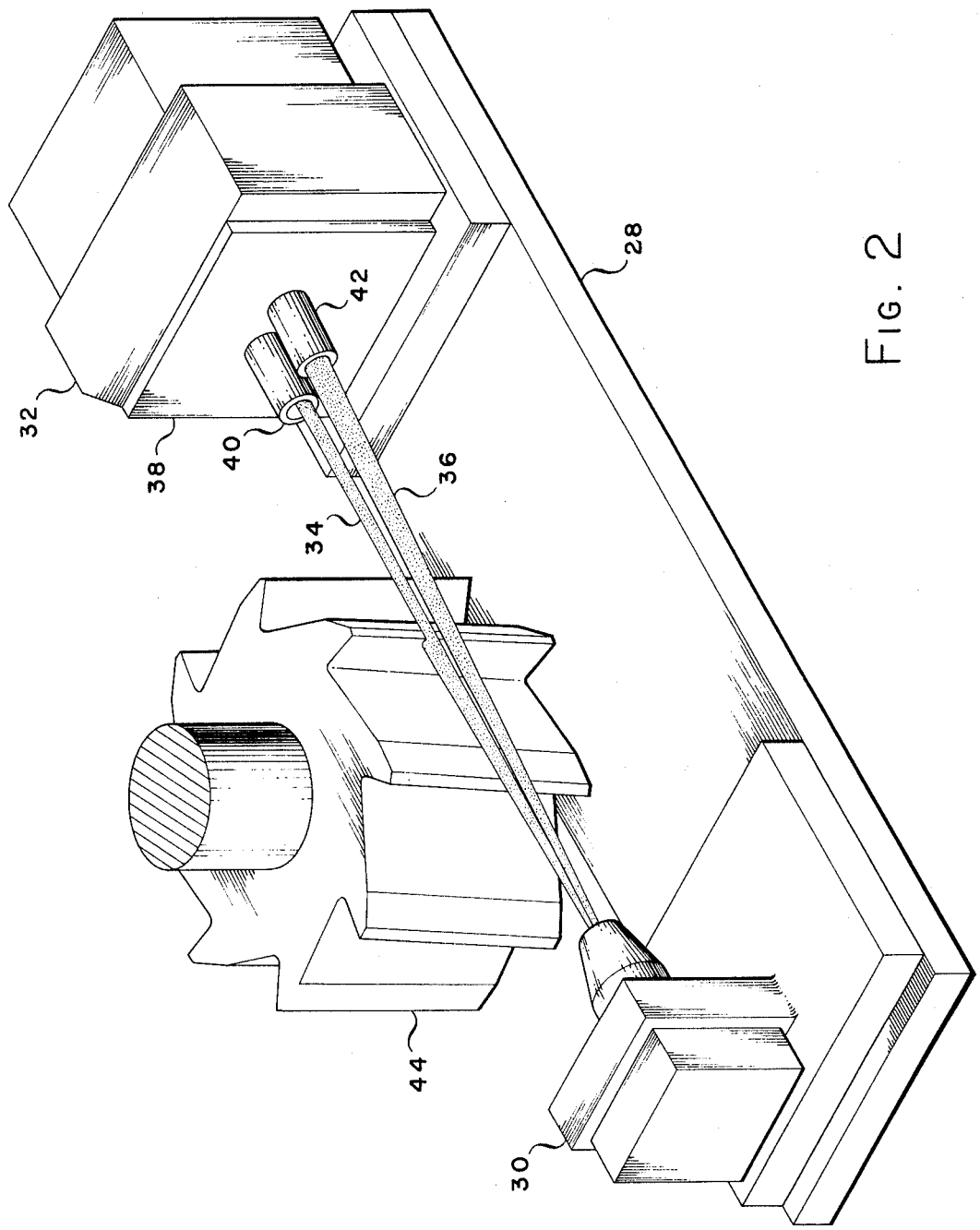
FIG. 2 is an elevational view of the light source and associated light sensitive devices which may be employed to monitor the position of the cutter.

Referring to FIG. 2, the emitter 30 and detector 32 subassemblies are mounted on plate 28. A light source, such as a gallium arsenide light emitting diode, is mounted within emitter subassembly 30 and emits a light beam. Although the light beam emitted covers a large area, only two distinct portions 34 and 36 are shown for clarity. Two photo detectors are mounted behind plate 38 of detector subassembly 32 that cooperates with the first and second shield 40 and 42 respectively in plate 38.

When a cutting tool 44 is brought to the measuring position of the $x$ and $y$ measuring module, it interrupts a portion of the measuring light beam 34. As can be understood with reference to FIG. 3, the signal conditioner 58 processes the amplified signal sensed by the measuring detector 50 and the reference detector 48 and produces an output signal proportional in amplitude to the difference of these signals.

Figure 3:
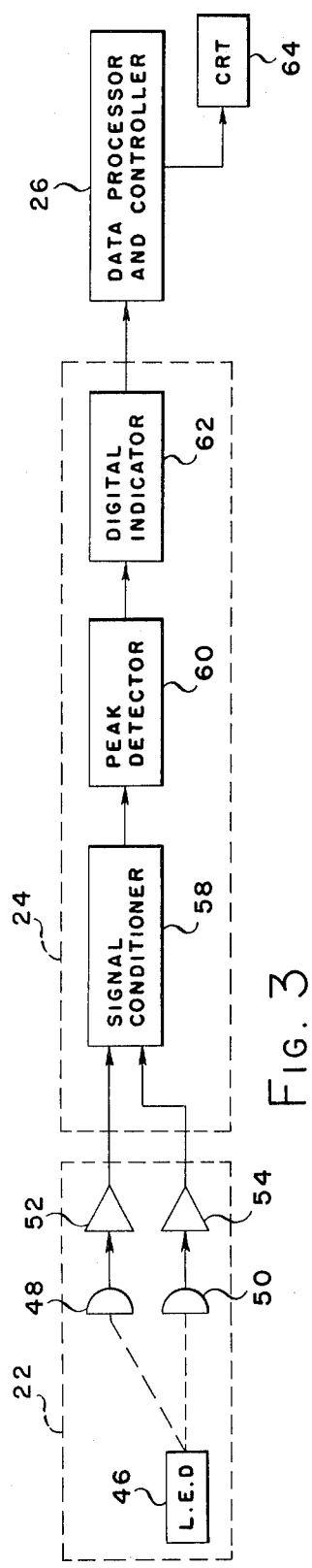
FIG. 3 is a block diagram schematically showing an embodiment of the cutter monitor of the invention.

In the block diagram FIG. 3, the embodiment of a cutter monitor in accordance with the invention is illustrated. The output from preamplifiers 52 and 54 are fed to the signal conditioner 58 where they are phase and gain balanced and amplified. When correctly balanced and with the beams undisturbed there is no signal out. The output signal from the signal conditioner 58 to the peak detector 60 is proportional to the amount of disturbance of the measuring beam 34, FIG. 2.

The signal conditioner 58 output signal is then fed to the peak detector 60 which selects the highest reading and stores it. The highest reading corresponds to the highest tooth on the cutter. Where the peak reading is received, the peak measurement signal is sent to the digital indicator 62, which may be any conventional digital indicator such as Electro-Numerics Corporation Model No. 3410-BCD, where it is displayed and converted to binary coded decimal format. The peak measurement (High Tooth) signal in BCD (binary coded decimal) format is transmitted to the data processor and controller 26. The data processor and controller 26 is provided the information necessary, through the part program data, to accept or reject each cutter at its $x$, $y$ and $z$ reading. If the cutter is rejected, the machine is automatically stopped and the cathode ray tube (CRT) displays this source of the error. If the cutter peak reading relative to the programmed path is within tolerance it is permitted to continue on to the work piece.

Figure 4:
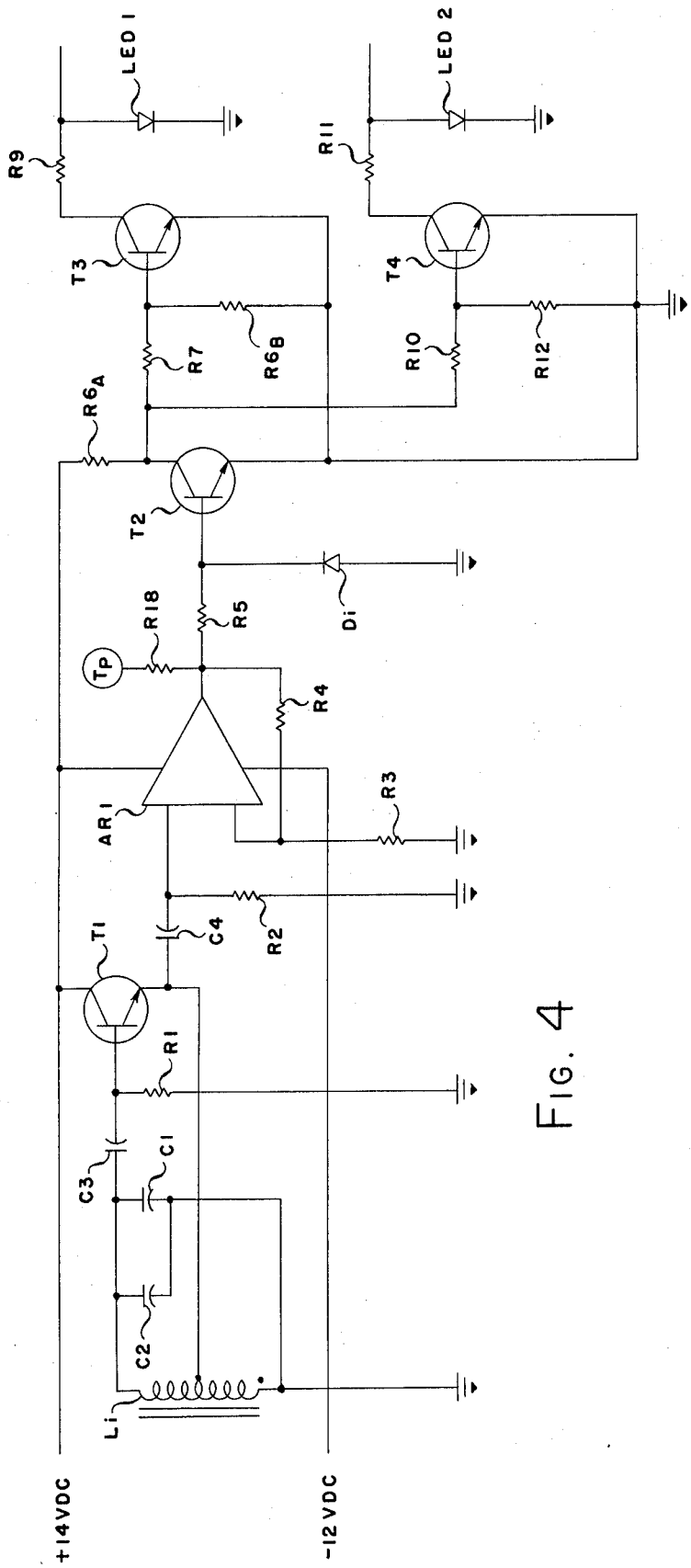
FIG. 4 is a schematic diagram of an exemplary circuit for driving the light emitting diode in the present invention.

FIG. 4 shows a representative circuit for driving the light emitting diodes. This driver pulses the two light emitting diodes (one for the $x$ axis and one for the $y$ axis) on and off to obtain a modulated source of infrared radiation. Inductor Li along with the capacitor C3 form the L-C tank circuit for the oscillator. This L-C tank circuit along with transistor $T_1$, which may be a field effect transistor, function as an oscillator to generate the light emitting diodes switching signal. The output of $T_1$ is fed to operational amplifier AR1 which is used to obtain the square wave from the oscillator signal. This square wave output is then fed to predriver transistor $T_2$, which in turn drives two power output transistors, $T_3$ and $T_4$. $T_3$ and $T_4$ drive the two light emitting diodes LED 1 and LED 2 respectively through current limiting resistors R9 and R11, respectively.

FIG. 5A shows a representative schematic of a preamplifier that may be used in the present invention. The measuring photo detector PD2 is connected to one gate of the dual field effect transistor T5-B and the reference photo detector PD1 is connected to the other gate of that field effect transistor T5-B. The field effect transistors are operated in a source following configuration and the output are fed to a pair of operational amplifiers AR2 and AR3 for amplification. The outputs from the operational amplifier are fed to the two inputs of the signal conditioning module 58 shown in FIG. 3.

Figure 5B:
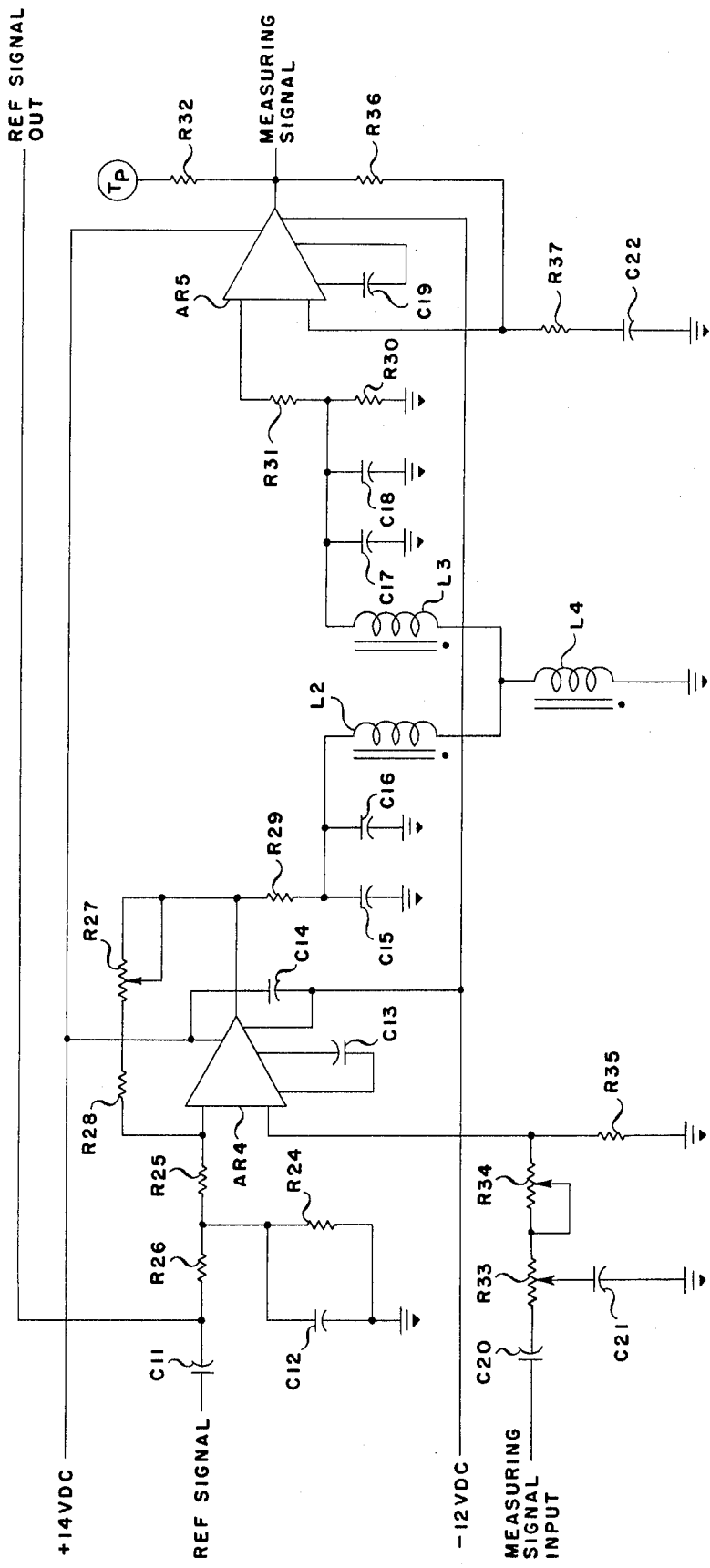
FIG. 5B is a schematic diagram of an exemplary combination comparator and signal conditioner utilizable in the present invention.

As can be seen in the FIG. 5B, the function of the signal conditioner amplifier is to yield an output which is dependent upon the difference between the two photo detector signals. The output signal from the reference signal preamplifier 54 is fed to the input of operational amplifier AR4. The output of the measuring preamplifier 52 is applied to the noninverting input of operational amplifier AR4 through a phase balance which comprises resistor R33 and capacitor C21 and a gain balance, which comprises resistor R34. The phase and gain balance controls are used to balance signals from the preamplifiers. Resistor R27 in the feedback loop of the operational amplifier AR4 is used to adjust the gain of the first stages of the operational amplifier. The output of operational amplifier AR4 is fed to a second operational amplifier AR5 through a bandpass filter comprising $C_{16}$, $L_3$, $L_4$ and $C_{17}$, which removes noise and signal harmonics. The bandpass filter is of conventional design. See page 237 of the Fourth Edition (1950) "Reference Data Radio Engineers," International Telephone & Telegraph Corporation. The second operational amplifier AR5 is used to further boost the signal level to provide isolation between the bandpass filter and the following stages. The gain of operational amplifier AR5 is controlled by resistor $R_{36}$ and resistor $R_{37}$. Capacitor $C_{22}$ maintains a D.C. bias on operational amplifier AR5 to stabilize the gain.

Figure 5C:
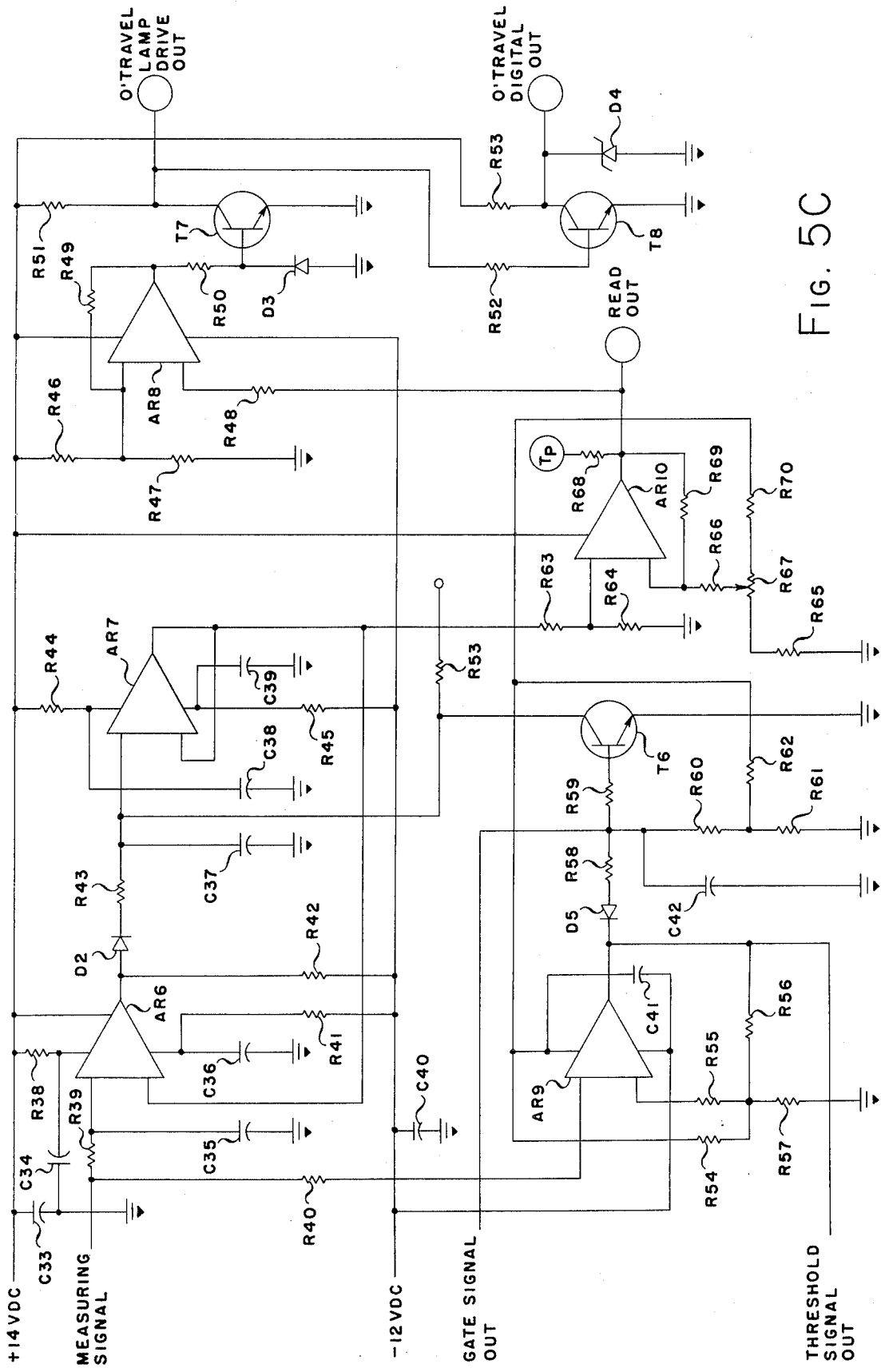
FIG. 5C is a schematic diagram of an exemplary peak detector utilizable in the present invention.

The output from the signal conditioner 58 is fed to a peak detector 60 which is shown in FIG. 5C. The peak detector is used to obtain a DC output voltage which is a function of the peak amplitude of the input signal from the signal conditioner. The input signal from the signal conditioner is fed to voltage comparator AR6 which produces an output pulse each time the positive cycle input signal exceeds the predetermined voltage at the inverting input of the voltage comparator AR6. These pulses are used to charge a data storage capacitor C37 through a low leakage diode D2. The voltage across capacitor C37 is sensed by operational amplifier AR7, which is connected for unity gain. The output of the operational amplifier AR9 is fed back to the inverter input of the voltage comparator. This feedback functions to limit the charge on the data storage capacitor C37 to the positive feed value of the input signal. The output of operational amplifier AR7 is also fed to a DC amplifier AR10. This stage incorporates a control R67 for setting the output level to zero during calibration of the system.

After the cutting tool has left the measuring beam for a predetermined period of time, like one second, operational amplifier AR9 and field effect transistor $T_6$ reset data storage capacitor C37. Operational amplifier AR9 is connected as a threshold detector that produces an output pulse when the input signal exceeds a predetermined voltage. The output pulses produced by AR9 are used to charge a capacitor C42 through diode D5. The gate of the field effect transistor $T_6$ is positively biased which causes field effect transistor $T_6$ to conduct, keeping capacitor C37 discharged.

When capacitor C42 is negatively charged, this causes field effect transistor $T_6$ to turn off, which in turn allows the data or capacitor C37 to be charged by the measuring signal as above explained.

While the cutter monitor described herein is presently considered to be preferred, it is contemplated that numerous various other variations and modifications within the purview of those skilled in the art can be made therein. The following claims are intended to cover all such variations and modifications as fall within the true spirit and scope of the invention.

We claim:

1. In a cutter monitor system for monitoring the position of a cutter on a machine, the improvement comprising:
    a non-contact cutter monitor assembly including means for generating electrical signals representative of the position of the cutter,
    said electrical signal generating means including a light source, a reference detector and a measuring detector, said cutter being positioned between said source and said measuring detector to intercept a portion of the light from said source to said measuring detector said reference detector and said measuring detector simultaneously sensing the impinging light from said light source and simultaneously producing output signals proportional to the impinging light from said light source, said electrical signal generating means also including a first preamplifier for amplifying the output signal from said reference detector and a second preamplifier for amplifying the output signal from said measuring detector, a signal conditioning means electrically connected to the outputs of said first and second preamplifier, said signal conditioning means producing an electrical output proportional to the difference between said outputs from said first and second preamplifiers to indicate the position of said cutter, a peak detector electrically coupled to said signal conditioning means for receiving the electrical output from said signal conditioning means, said peak detector including means for storing the highest signal received from said signal means, and digital indicator means for displaying the magnitude of said peak signal and producing a binary decimal output that can be fed to a data processor and controller.

2. The cutter monitor system of claim 1 wherein said signal conditioning means includes a first operational amplifier for comparing the difference between the amplified reference signal and the amplified measuring signal and generating a difference signal proportional to said difference and a second operational amplifier for amplifying said difference signal.

3. The cutter monitor system of claim 2 wherein said storage means in said peak detector comprises a capacitor.

* * * * *